July 6, 1937.  C. H. COOLIDGE ET AL  2,086,401
MECHANISM FOR PRODUCING AXIAL RECIPROCATION
Filed Jan. 15, 1937
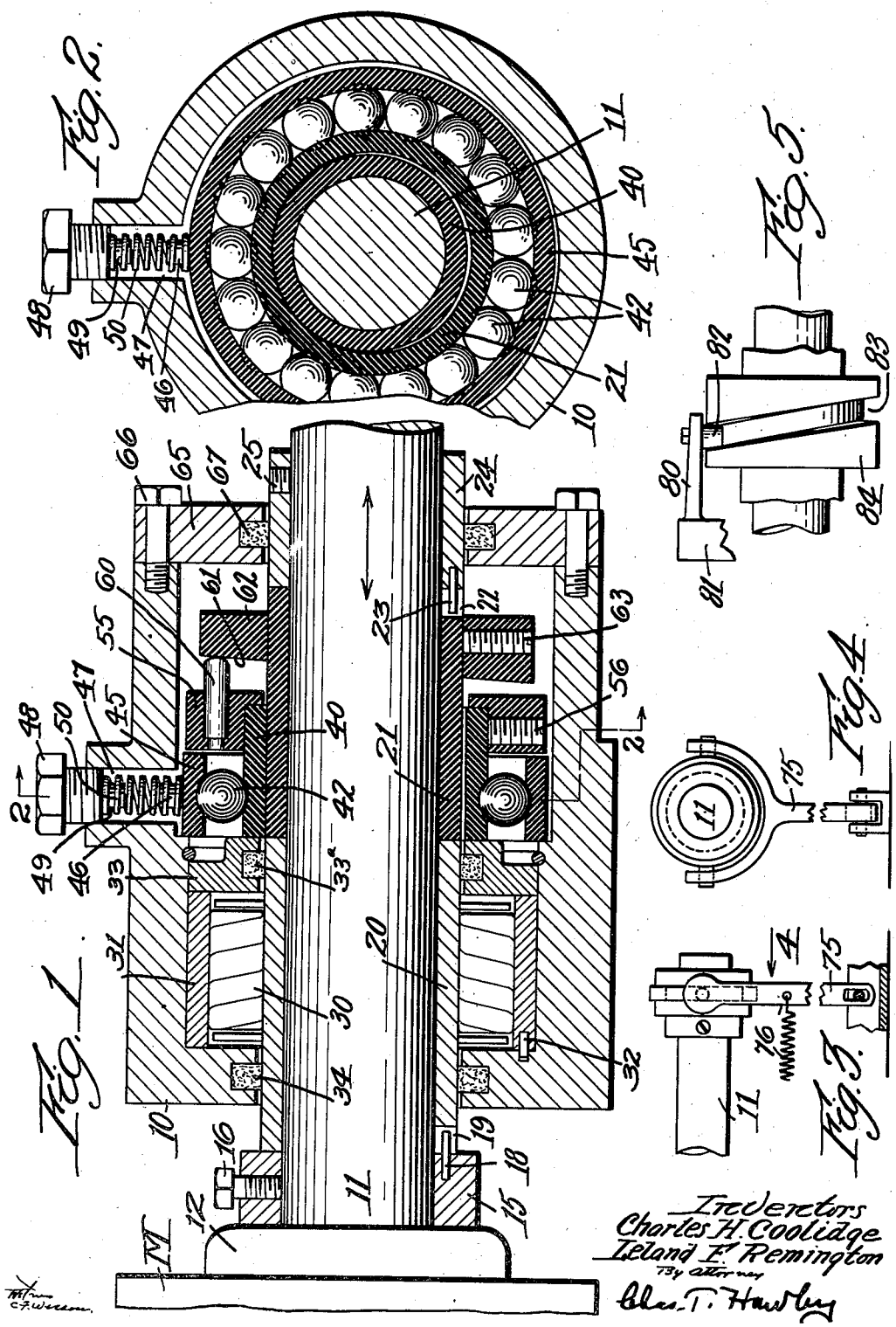

Patented July 6, 1937

2,086,401

UNITED STATES PATENT OFFICE 2,086,401

MECHANISM FOR PRODUCING AXIAL RECIPROCATION

Charles H. Coolidge and Leland F. Remington, Worcester, Mass., assignors to Curtis & Marble Machine Company, Worcester, Mass., a corporation of Massachusetts Application January 15, 1937, Serial No. 120,832

9 Claims. (Cl. 74—57)

This invention relates to mechanism for producing axial reciprocation of a rotated shaft or cylinder or other rotated member. It is desirable in many instances to produce such axial reciprocation in order to distribute wear on the rotated part and also to permit more perfect and uniform work to be produced.

Our invention is particularly applicable to textile shears and to other machines having elongated revolving cutters or elongated grinding cylinders or rolls.

It is the general object of our invention to provide improved and simplified mechanism for producing such axial reciprocation in a rotated part.

A further object is to provide mechanism for this purpose in a form in which it may be incorporated with one of the supporting bearings of the rotated part.

A further feature of the invention relates to a construction in which the reciprocating movement is produced in part or in whole by a simple cam carried by a rotated part.

Our invention further relates to arrangements and combinations of parts which will be hereinafter described and more particularly pointed out in the appended claims.

Preferred forms of the invention are shown in the drawing, in which

Fig. 1 is a sectional side elevation of one form of our improved reciprocating mechanism;

Fig. 2 is a partial sectional end elevation, taken along the line 2—2 in Fig. 1;

Fig. 3 is a partial side elevation of a modified construction;

Fig. 4 is an end view looking in the direction of the arrow 4 in Fig. 3; and

Fig. 5 is a partial side elevation of a further modification.

Referring to Figs. 1 and 2, we have shown our invention incorporated in a bearing support 10 of a rotated shaft 11. The shaft 11 may for illustration be an armature shaft for a motor M and may have an armature 12 mounted thereon.

A collar 15 is secured to the shaft 11 by a set-screw 16 and preferably has a stud 18 extending into a slot 19 in the end of a sleeve 20 which snugly fits the shaft 11. A second sleeve 21 abuts the sleeve 20 and may have a slot 22 to receive a stud 23 in a sleeve or collar 24 which is secured to the shaft 11 by a set-screw 25. All of these parts are thus secured to rotate with the shaft 11.

A series of rolls 30 form a roller bearing for the sleeve 20 on the shaft 11 and are enclosed by an outer sleeve or race 31, mounted in the casing 10 and held from rotation in any convenient manner, as by a pin 32.

A disc 33 is mounted in the casing 10 adjacent one end of the outer sleeve or race 31 and said disc is loose on the sleeve 20. A packing 33a is preferably provided in an annular groove in the disc 33, and a similar packing 34 is provided in a similar groove in the end wall of the casing 10. The packings 33a and 34 prevent axial escape of the grease in which the rolls 30 commonly rotate.

An inner race 40 of a ball bearing is loosely mounted on the sleeve 21 and has a definite clearance relative thereto. This clearance may be varied in amount for a reason to be explained, but a difference of 0.02" in diameter between the inside of the race 40 and the outside of the sleeve 21 may be considered an average clearance.

The usual balls 42 are mounted between the inner race 40 and an outer race 45. The outer race is provided at one point with a stud or projection 46, extending outward into a passage or opening 47 which is threaded to receive a pressure adjusting screw 48. A spring 50 is mounted between the screw 48 and the ring 45 and is held in position by the projection 46 on the race 45 and a similar projection 49 on the inner end of the screw 48.

The race 45 is thus held from rotation and the whole ball bearing is firmly pressed against a portion of the sleeve 21 by the spring 50, with the amount of pressure determined by the setting of the screw 48.

A ring 55 is mounted on an extension of the inner race 40 and may be secured thereto by a screw 56. A stud 60 is mounted in the ring 55 and projects axially therefrom to engage the side surface 61 of a cam 62, mounted on the sleeve 21 and secured thereto by a screw 63.

The casing 10 may have a removable end plate 65 secured thereto by screws 66 and preferably provided with a packing 67 in its inner edge portion, so that the ball bearing and associated parts may run in oil if so desired.

Having described the details of construction of this form of our invention, we will now describe the manner in which axial reciprocation of the shaft 11 is produced.

As the shaft 11 and sleeves 20 and 21 rotate, the inner ball bearing race 40 will roll on the sleeve 21 and in close contact with the portion of the sleeve surface adjacent the spring 50. The inner diameter of the race 40 is, as stated, slightly but definitely greater than the outer diameter of the sleeve 21. Consequently the rolling contact of the race and sleeve at one point only will cause the race to rotate at a differential speed which is very slightly less than the speed of the shaft 11 and sleeve 21.

For instance, if the shaft 11 and sleeve 21 are rotated at 1200 revolutions per minute, the race 40 may rotate at a speed which is one percent less, or at 1188 revolutions. The ring 55 and stud 60 rotate with the race 40, while the cam 62 rotates with the sleeve 21. Consequently for every 1200 revolutions of the cam 62, the ring 55 and stud 60 will make only 1188 revolutions. In other words, the cam 62 will make one revolution relative to the ring 55 and stud 60 for every 100 revolutions of the shaft 11.

Every revolution of the cam 62 relative to the stud 60 will obviously force the shaft 11 a limited distance to the right in Fig. 1 and will also allow time for the shaft to be returned to the left by any suitable means to complete the reciprocation.

In the motor drive shown in Fig. 1, the armature 12 will be axially displaced in its magnetic field when the shaft 11 is shifted to the right, and the pull of the magnetic forces on the displaced armature will tend to move the armature and shaft toward the left and to center the armature axially, thus providing the necessary means to complete the reciprocation.

The extent of the reciprocating movement is determined by the contour of the cam 62, and the relative speed of reciprocation is determined by the amount of clearance between the sleeve 21 and the inner race 40. The greater the difference in diameter and the greater the resulting clearance, the greater will be the difference in speed of rotation between the ring 55 and stud 60, and the cam 62, and the more rapid will be the reciprocation.

In Figs. 3 and 4 we have shown a construction in which a yoke lever 75 and spring 76 are provided to return the shaft 11 to the left to complete the reciprocation.

In Fig. 5 we have shown a construction in which an arm 80 on a ring 81 has a roll 82 which projects into a groove 83 in the periphery of a cam 84, so that the cam itself will control the reciprocating movement in both directions. The ring 81 corresponds to the ring 55 in Fig. 1.

Having thus described three different forms of our invention and the advantages thereof, we do not wish to be limited to the details herein disclosed, otherwise than as set forth in the claims, but what we claim is:—

1. Mechanism for producing axial reciprocation of a rotated member comprising two substantially concentric coacting members, one of which is driven, said coacting members having surfaces of slightly different diameters which are in rolling contact with each other and which thereby cause said members to rotate at differential speeds, and means rendered operative by said differential speeds to move said rotated member axially.

2. Mechanism for producing axial reciprocation of a rotated member comprising two coacting members both rotating substantially about the axis of said rotated member and one of which is driven, said coacting members having surfaces of slightly different diameters which are in rolling contact with each other and which thereby cause said members to rotate at differential speeds, and cam means rendered operative by said differential speeds to move said rotated member axially.

3. Mechanism for producing axial reciprocation of a rotated member comprising two coacting members substantially concentric with said rotated member, said coacting members having surfaces of slightly different diameters which are in rolling contact with each other and which thereby cause said members to rotate at differential speeds, means controlled in its operation by said differential speeds effective to move said rotated member axially in one direction, and means to restore said rotated member to initial axial position.

4. Mechanism for producing axial reciprocation of a rotated member comprising telescoping members both rotating substantially about the axis of said rotated member, said coacting members having surfaces of slightly different diameters which are in rolling contact with each other and which thereby cause said members to rotate at differential speeds, means controlled by said differential speeds effective to move said rotated member axially in one direction, and additional means to restore said rotated member to initial axial position.

5. Mechanism for producing axial reciprocation of a rotated member comprising two coacting members both rotating substantially about the axis of said rotated member, said coacting members having surfaces of slightly different diameters which are in rolling contact with each other and which thereby cause said members to rotate at differential speeds, means controlled by said differential speeds effective to move said rotated member axially in one direction, and electromagnetic means to move said rotated member in the opposite direction.

6. Mechanism for producing axial reciprocation of a rotated member comprising two coacting members both rotating substantially about the axis of said rotated member, said coacting members having surfaces of slightly different diameters which are in rolling contact with each other and which thereby cause said members to rotate at differential speeds, means controlled by said differential speeds effective to move said rotated member axially in one direction, and spring means to yieldingly restore said rotated member to initial position.

7. Mechanism for producing axial reciprocation of a rotated member comprising two coacting members substantially concentric with said rotated member, said coacting members having surfaces of slightly different diameters which are in rolling contact with each other and which thereby cause said members to rotate at differential speeds, means controlled in its operation by said differential speeds effective to move said rotated member axially in one direction, and a double acting cam controlled in its operation by said differential speed and effective to reciprocate said rotated member.

8. Mechanism for producing axial reciprocation of a rotated member comprising telescoping members having a definite but relatively slight difference in diameter between the outer diameter of the inner telescoping member and the inner diameter of the outer telescoping member, said inner member being mounted on and rotating with said rotated member and said outer member rolling on said inner member, a cam mounted to rotate with one of said telescoping members and a device mounted to rotate with the other telescoping member and engaging said cam, said telescoping members rotating at differential speeds, and said cam and device effecting axial movement of said rotated member.

9. Mechanism for producing axial reciprocation of a rotated member comprising telescoping members having a definite but relatively slight difference in diameter between the outer diameter of the inner telescoping member and the inner diameter of the outer telescoping member, said inner member being mounted on and rotating with said rotated member and said outer member rolling on said inner member, a side cam mounted to rotate with said rotated member, and a device mounted to rotate with said outer telescoping member and engaging the side cam face of said cam, said outer telescoping member rotating at slightly less speed than said rotated member and inner member, and said cam and device effecting axial movement of said rotated member.

CHARLES H. COOLIDGE.
LELAND F. REMINGTON.